United States Patent
Tanaka et al.

(10) Patent No.: US 11,986,885 B2
(45) Date of Patent: May 21, 2024

(54) FINE PARTICLE PRODUCTION APPARATUS AND FINE PARTICLE PRODUCTION METHOD

(71) Applicants: NATIONAL UNIVERSITY CORPORATION KANAZAWA UNIVERSITY, Kanazawa (JP); NISSHIN SEIFUN GROUP INC., Tokyo (JP)

(72) Inventors: Yasunori Tanaka, Kanazawa (JP); Naoto Kodama, Kanazawa (JP); Kazuki Onda, Kanazawa (JP); Shu Watanabe, Saitama (JP); Keitaro Nakamura, Saitama (JP); Shiori Sueyasu, Saitama (JP)

(73) Assignees: NATIONAL UNIVERSITY CORPORATION KANAZAWA UNIVERSITY, Ishikawa (JP); NISSHIN SEIFUN GROUP INC., Tokyo (JP)

( * ) Notice: Subject to any disclaimer, the term of this patent is extended or adjusted under 35 U.S.C. 154(b) by 84 days.

(21) Appl. No.: 17/615,775

(22) PCT Filed: Jun. 4, 2020

(86) PCT No.: PCT/JP2020/022164
§ 371 (c)(1),
(2) Date: Dec. 1, 2021

(87) PCT Pub. No.: WO2020/246551
PCT Pub. Date: Dec. 10, 2020

(65) Prior Publication Data
US 2022/0219236 A1    Jul. 14, 2022

(30) Foreign Application Priority Data
Jun. 5, 2019 (JP) .................. 2019-105218

(51) Int. Cl.
*B22F 9/14*    (2006.01)
*B22F 9/12*    (2006.01)
*H05H 1/42*    (2006.01)

(52) U.S. Cl.
CPC .................. *B22F 9/14* (2013.01); *B22F 9/12* (2013.01); *H05H 1/42* (2013.01); *B22F 2202/13* (2013.01)

(58) Field of Classification Search
None
See application file for complete search history.

(56) References Cited

U.S. PATENT DOCUMENTS

| | | |
|---|---|---|
| 2008/0006954 A1 | 1/2008 | Yubuta et al. |
| 2012/0201266 A1 | 8/2012 | Boulos et al. |

(Continued)

FOREIGN PATENT DOCUMENTS

| | | | |
|---|---|---|---|
| JP | 2006247446 A | | 9/2006 |
| JP | 2010/131577 A | * | 6/2010 |

(Continued)

OTHER PUBLICATIONS

English translation of JP 2010-131577 (originally published Jun. 17, 2010), obtained from PE2E search.*

(Continued)

*Primary Examiner* — George Wyszomierski
(74) *Attorney, Agent, or Firm* — MUNCY, GEISSLER, OLDS & LOWE, P.C.

(57) ABSTRACT

Provided are a fine particle production apparatus and a fine particle production method that can control the particle sizes of fine particles, and efficiently produce a large amount of fine particles having good particle size uniformity. The present invention comprises: a raw material supply unit which supplies raw materials for fine particle production into thermal plasma flame; a plasma torch in which the (Continued)

thermal plasma flame is generated, and which evaporates the raw material supplied by the raw material supply unit by means of the thermal plasma flame to form a mixture in a gas phase state; and a plasma generation unit which generates thermal plasma flame inside the plasma torch. The plasma generation unit includes: a first coil which surrounds the plasma torch, a second coil which is installed below the first coil in the longitudinal direction of the plasma torch and surrounds the circumference of the plasma torch; a first power supply unit which supplies an amplitude-modulated first high-frequency current to the first coil; and a second power supply unit which supplies an amplitude-modulated second high-frequency current to the second coil. The degree of modulation of the first high-frequency current is smaller than the degree of modulation of the second high-frequency current.

7 Claims, 6 Drawing Sheets

(56) References Cited

U.S. PATENT DOCUMENTS

2018/0324937 A1* 11/2018 Gutman ............... C23C 4/134
2021/0061665 A1* 3/2021 Tanaka ................. B22F 9/14

FOREIGN PATENT DOCUMENTS

| JP | 2012055840 A | 3/2012 |
| JP | 2012521617 A | 9/2012 |
| JP | 2017105680 A | 6/2017 |

OTHER PUBLICATIONS

Kuraishi et al., "Temperature Behavior in a Tandem Type of Modulated Induction Thermal Plasma for Materials Processings," Journal of Physics: Conference Series 441 (2013), 15 pages.

* cited by examiner

FINE PARTICLE PRODUCTION APPARATUS AND FINE PARTICLE PRODUCTION METHOD

TECHNICAL FIELD

The present invention relates to a fine particle production apparatus and a fine particle production method using a thermal plasma flame, particularly to a fine particle production apparatus and a fine particle production method that generate a thermal plasma flame by electromagnetic induction by use of two coils and two independent high frequency power sources that separately supply high frequency currents to the two coils, thereby producing fine particles.

BACKGROUND ART

At present, fine particles such as silicon fine particles, oxide fine particles, nitride fine particles and carbide fine particles are used in a wide variety of fields. One example of a method of producing such fine particles is a gas-phase process. Exemplary gas-phase processes include chemical processes in which various gases or the like are chemically reacted at high temperature and physical processes in which a substance is irradiated with a beam such as an electron beam or a laser beam so as to be decomposed and evaporated, thereby generating fine particles.

Another gas-phase process is a thermal plasma process. The thermal plasma process is a process for producing fine particles by instantly evaporating feedstock in a thermal plasma flame and then quenching and solidifying the resulting evaporated product. The thermal plasma process has many advantages; for instance, the thermal plasma process is clean and highly productive, provides a high temperature and therefore is applicable to high melting point materials, and enables relatively easy complexing as compared to other gas-phase processes. Accordingly, the thermal plasma process is actively utilized as a method of producing fine particles.

In a fine particle production method using a conventional thermal plasma process, for instance, a feedstock substance is powdered, the powdered feedstock (powdery feedstock, powder) is, together with carrier gas and the like, dispersed and directly supplied as the feedstock into thermal plasma, whereby fine particles are produced.

In addition, for instance, Patent Literature 1 describes a fine particle production method that involves dispersing a material used for producing fine particles (raw material) in a dispersion medium to form a slurry, and as the feedstock, introducing the slurry into a thermal plasma flame while transforming the slurry into droplets, thereby producing fine particles.

CITATION LIST

Patent Literature

Patent Literature 1: JP 2006-247446 A

Non-Patent Literature

Non-patent Literature 1: K. Kuraishi, et al., J. Phys. Conf. Ser., 441, 012016 (2013)

SUMMARY OF INVENTION

Technical Problems

For a fine particle production method, supplying feedstock together with carrier gas into a thermal plasma flame and, as in Patent Literature 1 stated above, supplying feedstock in the form of a slurry have been conventionally known. Among thermal plasma flames, however, in the case of induction thermal plasma generated by electromagnetic induction, a thermal plasma flame is sometimes destabilized due to disturbance from the outside.

To eliminate such destabilization of a thermal plasma flame caused by disturbance from the outside, for example, Non-patent Literature 1 proposes generating a thermal plasma flame by use of two coils and two independent high frequency power sources connected separately to the two coils.

Meanwhile, in addition to eliminating destabilization of a thermal plasma flame caused by disturbance from the outside as above, it has been required to control the particle size of obtained fine particles and provide the uniformity of obtained fine particles in particle size.

Further, even in the configuration for eliminating destabilization of a thermal plasma flame caused by disturbance from the outside as conventionally proposed, when a large amount of feedstock is supplied to a thermal plasma flame for the purpose of increasing the productivity of fine particles, the thermal plasma flame may be destabilized, e.g., extinguished, and therefore this configuration is not good enough to improve the productivity.

An object of the present invention is to provide a fine particle production apparatus and a fine particle production method that are capable of controlling the particle size of fine particles and efficiently producing a large amount of fine particles having excellent uniformity in particle size.

Solution to Problems

In order to attain the above-described object, the present invention provides a fine particle production apparatus comprising:
a feedstock supply section configured to supply feedstock for fine particle production into a thermal plasma flame;
a plasma torch configured to allow the thermal plasma flame to be generated therein and, by use of the thermal plasma flame, evaporate the feedstock supplied by the feedstock supply section to transform the feedstock into a mixture in a gas phase state;
a plasma generation section configured to generate the thermal plasma flame inside the plasma torch,
wherein the plasma generation section includes a first coil surrounding a periphery of the plasma torch, a second coil disposed under the first coil and surrounding the periphery of the plasma torch, a first power source section supplying the first coil with first high frequency current amplified-modulated, and a second power source section supplying the second coil with second high frequency current amplitude-modulated, the first coil and the second coil are arranged side by side in a longitudinal direction of the plasma torch, and a degree of modulation of the first high frequency current is smaller than that of the second high frequency current.

It is preferable that the fine particle production apparatus includes a gas supply section configured to supply quenching gas to the thermal plasma flame.

In addition, it is preferable that the plasma generation section supplies the first high frequency current supplied to the first coil by the first power source section and the second high frequency current supplied to the second coil by the second power source section at a same timing, and that the feedstock supply section increases an amount of supply of the feedstock in a region where current amplitude of the first high frequency current supplied to the first coil and current amplitude of the second high frequency current supplied to the second coil are high.

It is preferable that a current value of the second high frequency current amplitude-modulated and supplied to the second coil is 0 ampere in a region where current amplitude of the second high frequency current is low.

In addition, it is preferable that the feedstock supply section supplies the feedstock into the thermal plasma flame with the feedstock being dispersed in a particulate form.

Further, it is preferable that the feedstock supply section disperses the feedstock in liquid to obtain a slurry and transforms the slurry into droplets to supply the droplets into the thermal plasma flame.

In addition, the present invention provides a fine particle production method using a thermal plasma flame generated inside a plasma torch, there being provided a first coil surrounding a periphery of the plasma torch, a second coil disposed under the first coil and surrounding the periphery of the plasma torch, a first power source section supplying the first coil with first high frequency current amplitude-modulated, and a second power source section supplying the second coil with second high frequency current amplitude-modulated, the first coil and the second coil being arranged side by side in a longitudinal direction of the plasma torch, and the thermal plasma flame being generated by the first power source section and the second power source section, the method comprising:

a first step of supplying feedstock for fine particle production to the thermal plasma flame generated inside the plasma torch; and a second step of evaporating the feedstock by use of the thermal plasma flame to transform the feedstock into a mixture in a gas phase state and cooling the mixture, wherein in the first step and the second step, the first power source section supplies the first coil with the first high frequency current amplitude-modulated, the second power source section supplies the second coil with second high frequency current amplitude-modulated, and a degree of modulation of the first high frequency current is smaller than that of the second high frequency current.

It is preferable that in the second step, quenching gas is supplied to the thermal plasma flame to cool the mixture in a gas phase state.

In addition, it is preferable that in the first step, the first high frequency current supplied to the first coil by the first power source section and the second high frequency current supplied to the second coil by the second power source section are supplied at a same timing, and an amount of supply of the feedstock is increased in a region where current amplitude of the first high frequency current supplied to the first coil and current amplitude of the second high frequency current supplied to the second coil are high.

It is preferable that a current value of the second high frequency current amplitude-modulated and supplied to the second coil is 0 ampere in a region where current amplitude of the second high frequency current is low.

In addition, it is preferable that in the first step, the feedstock is supplied into the thermal plasma flame with the feedstock being dispersed in a particulate form.

Further, it is preferable that in the first step, the feedstock is dispersed in liquid to obtain a slurry, the slurry is transformed into droplets, and the droplets are supplied into the thermal plasma flame.

Advantageous Effects of Invention

With the fine particle production apparatus and the fine particle production method according to the present invention, it is possible to control the particle size of fine particles and efficiently produce a large amount of fine particles having excellent uniformity in particle size.

DESCRIPTION OF EMBODIMENTS

A fine particle production apparatus and a fine particle production method according to the present invention are described below in detail based on a preferred embodiment shown in the accompanying drawings.

Figure 1:
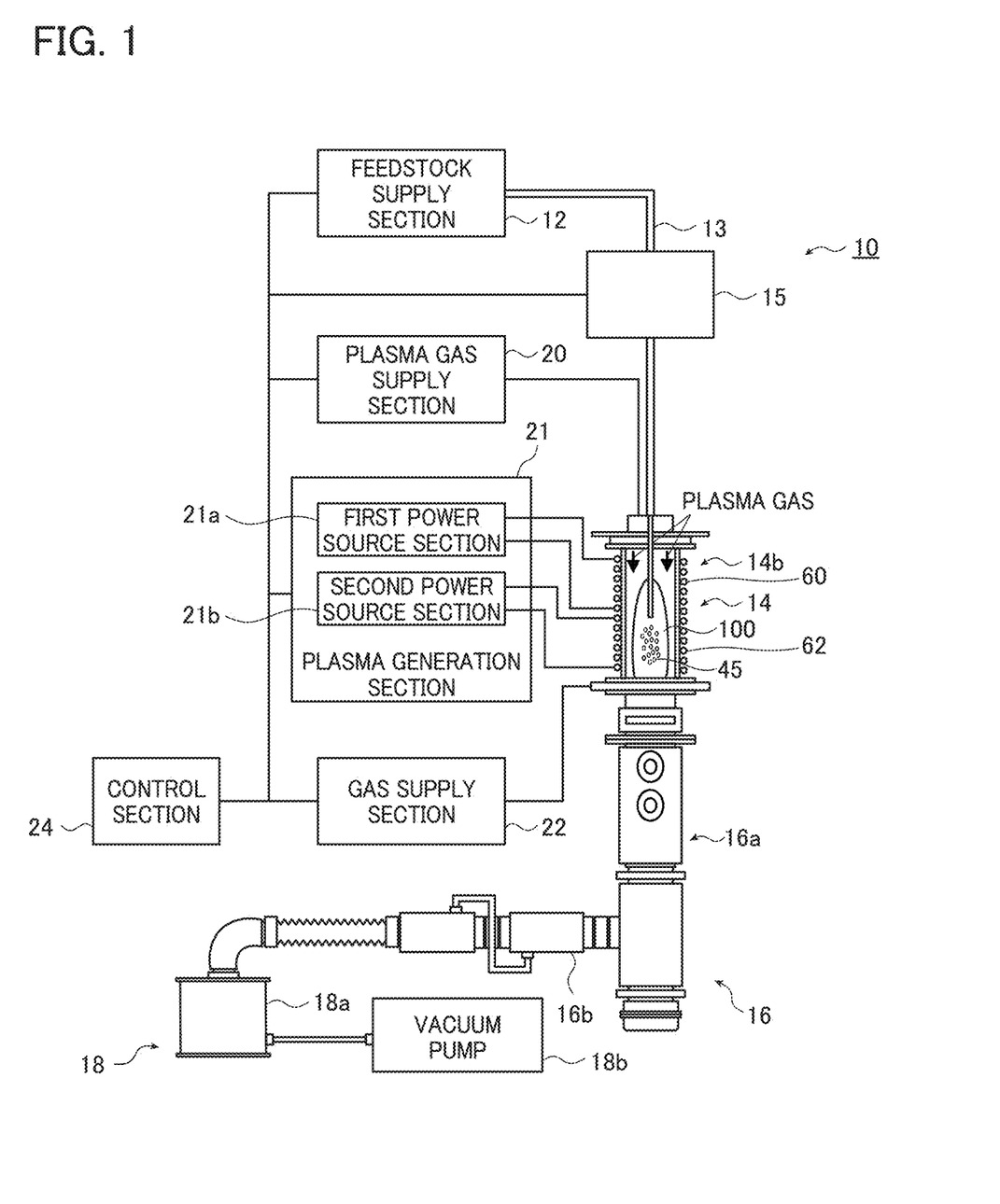
FIG. 1 is a schematic view showing an example of a fine particle production apparatus according to an embodiment of the invention.
Figure 2:
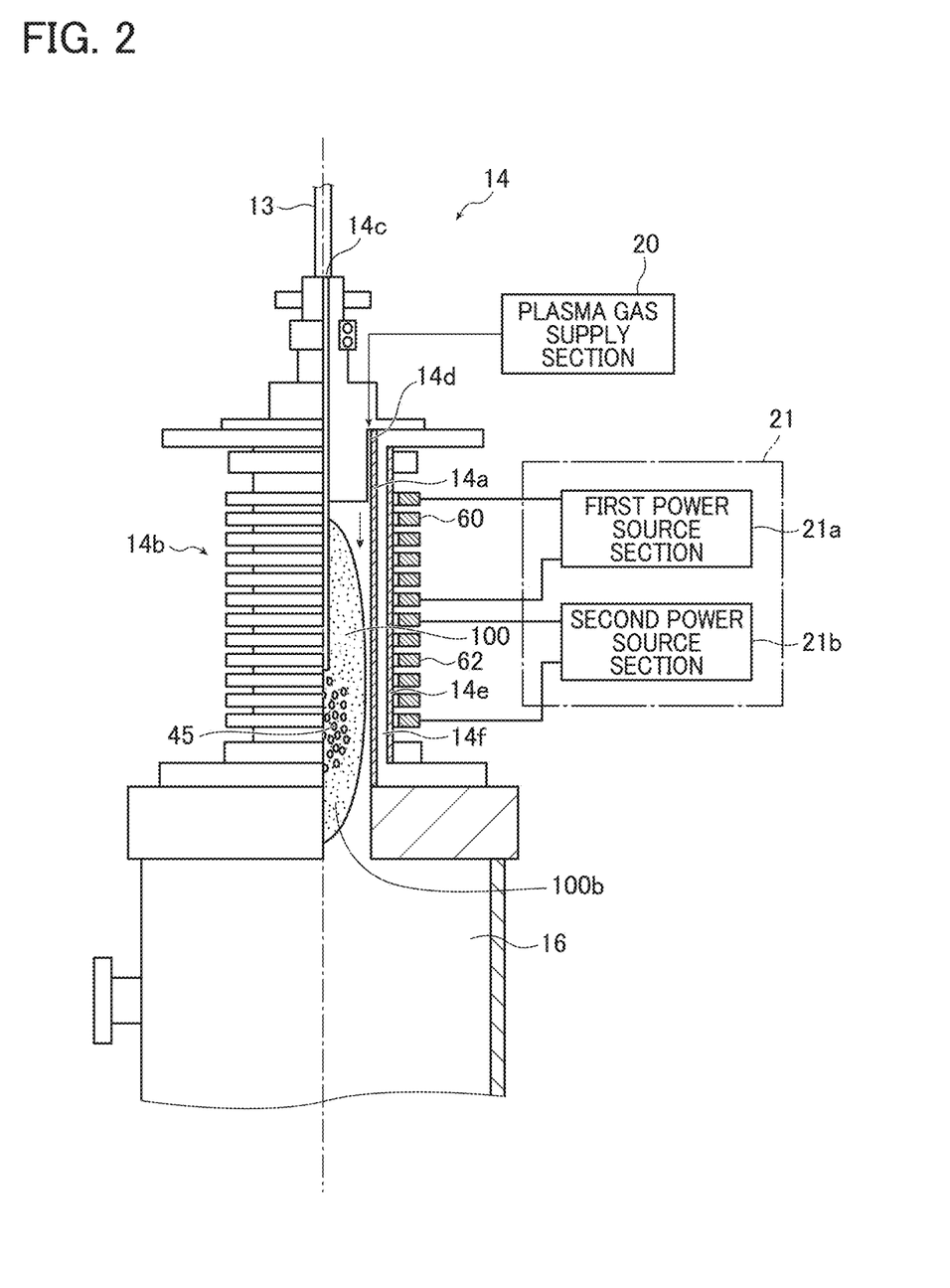
FIG. 2 is a partial cross-sectional view schematically showing an example of a plasma torch of the fine particle production apparatus according to the embodiment of the invention.

FIG. 1 is a schematic view showing an example of the fine particle production apparatus according to the embodiment of the invention, and FIG. 2 is a partial cross-sectional view schematically showing an example of a plasma torch of the fine particle production apparatus according to the embodiment of the invention.

A fine particle production apparatus 10 (hereinafter referred to simply as "production apparatus 10") shown in FIG. 1 is used for producing nanosized fine particles using feedstock for fine particle production. For instance, powder is used as the feedstock for fine particle production.

The production apparatus 10 can produce any fine particles with no limitation in the type, specifically, such fine particles as, in addition to metal fine particles, oxide fine particles, nitride fine particles, carbide fine particles and oxynitride fine particles by changing the composition of the feedstock.

The production apparatus 10 includes a feedstock supply section 12, a plasma torch 14, a chamber 16, a collection section 18, a plasma gas supply section 20, a plasma generation section 21, a gas supply section 22, and a control section 24.

The feedstock supply section 12 is connected to the plasma torch 14 through a hollow supply tube 13.

The supply tube 13 between the feedstock supply section 12 and the plasma torch 14 may be provided with an intermittent supply section 15 as described later. The intermittent supply section 15 is not an essential element in the production apparatus 10.

The chamber 16 is disposed below the plasma torch 14, and the collection section 18 is disposed downstream from the chamber 16. The plasma generation section 21 is connected to the plasma torch 14, and a thermal plasma flame 100 is generated in the plasma torch 14 by means of the plasma generation section 21 as described later.

The feedstock supply section 12 is provided to supply feedstock for fine particle production into the thermal plasma flame 100 generated in the plasma torch 14.

The type of the feedstock supply section 12 is not particularly limited as long as it can supply the feedstock into the thermal plasma flame 100, and the following two types are applicable: one supplying the feedstock into the thermal plasma flame 100 with the feedstock being dispersed in a particulate form, and one slurrying the feedstock and transforming the obtained slurry into droplets to supply the droplets into the thermal plasma flame 100.

For example, in the case where powder is used as the feedstock for fine particle production, the feedstock needs to be dispersed in a particulate form when supplied into the thermal plasma flame 100 in the plasma torch 14. Therefore, the feedstock is for instance dispersed in carrier gas so that the feedstock in a particulate form is supplied. In this case, the feedstock supply section 12 supplies the feedstock powder in a fixed amount into the thermal plasma flame 100 in the plasma torch 14 whilst maintaining the feedstock powder to be in a dispersed state. For the feedstock supply section 12 having such a function, usable examples include devices disclosed in JP 3217415 B and JP 2007-138287 A.

For example, the feedstock supply section 12 includes a storage tank (not shown) storing feedstock powder, a screw feeder (not shown) transporting the feedstock powder in a fixed amount, a dispersion section (not shown) dispersing the feedstock powder transported by the screw feeder into a particulate form before the feedstock powder is finally sprayed, and a carrier gas supply source (not shown).

Together with carrier gas to which push-out pressure is applied from the carrier gas supply source, the feedstock powder is supplied into the thermal plasma flame 100 in the plasma torch 14 through the supply tube 13.

The configuration of the feedstock supply section 12 is not particularly limited as long as the feedstock supply section 12 can prevent the feedstock powder from agglomerating and spray the feedstock powder into the plasma torch 14 with the feedstock powder being dispersed in a particulate form and the dispersed state being maintained. Inert gases such as argon gas (Ar gas) and nitrogen gas are usable as the carrier gas, for example.

For the feedstock supply section 12 supplying the feedstock powder in the form of a slurry, the device disclosed in JP 2011-213524 A may be used, for example. In this case, the feedstock supply section 12 includes a vessel (not shown) storing a slurry (not shown) having feedstock powder dispersed in liquid such as water, an agitator (not shown) agitating the slurry in the vessel, a pump (not shown) applying high pressure to the slurry to supply the slurry into the plasma torch 14 through the supply tube 13, and an atomization gas supply source (not shown) supplying atomization gas used to transform the slurry into droplets and supply the droplets into the plasma torch 14. The atomization gas supply source corresponds to the carrier gas supply source. The atomization gas is also called carrier gas.

In the case where the feedstock is supplied in the form of a slurry, the feedstock powder is dispersed in liquid such as water to obtain a slurry. The mixing ratio between the feedstock powder and water in the slurry is not particularly limited and is, for example, 5:5 (50%:50%) in the mass ratio.

In the case where used is the feedstock supply section 12 slurrying the feedstock powder and supplying the obtained slurry in the form of droplets, atomization gas to which push-out pressure is applied from the atomization gas supply source is, together with the slurry, supplied into the thermal plasma flame 100 in the plasma torch 14 through the supply tube 13. The supply tube 13 has a two-fluid nozzle mechanism for spraying the slurry to the thermal plasma flame 100 in the plasma torch and transforming it into droplets, and using this mechanism, the slurry is sprayed to the thermal plasma flame 100 in the plasma torch 14. That is, this makes it possible to transform the slurry into droplets. Similarly to the carrier gas described above, inert gases such as argon gas (Ar gas) and nitrogen gas are usable as the atomization gas, for example.

Thus, the two-fluid nozzle mechanism is capable of applying a high pressure to the slurry and atomizing the slurry with gas, i.e., the atomization gas (carrier gas), and is used as a method for transforming the slurry into droplets.

It should be noted that the nozzle mechanism is not limited to the two-fluid nozzle mechanism as above, and a single-fluid nozzle mechanism may also be used. As other methods, examples include a method which involves allowing a slurry to fall onto a rotating disk at a constant rate to transform the slurry into droplets (to form droplets) by the centrifugal force and a method which involves applying high voltage to a surface of a slurry to transform the slurry into droplets (to generate droplets).

The plasma torch 14 is configured to allow the thermal plasma flame 100 to be generated therein and, by use of the thermal plasma flame 100, evaporate the feedstock supplied by the feedstock supply section 12 to transform the feedstock into a mixture 45 in a gas phase state.

As shown in FIG. 2, the plasma torch 14 includes a quartz tube 14a and a high frequency oscillation coil 14b provided around the outer surface of the quartz tube 14a to surround the periphery of the plasma torch 14. The center portion of the top of the plasma torch 14 is provided with a supply port 14c into which the supply tube 13 is inserted, and a plasma gas supply port 14d is formed in the peripheral portion of the supply port 14c (on the same circumference).

For instance, powdery feedstock and the carrier gas such as argon gas or hydrogen gas are supplied into the plasma torch 14 through the supply tube 13.

The plasma gas supply port 14d is connected to the plasma gas supply section 20 via, for example, piping which is not shown. The plasma gas supply section 20 is configured to supply plasma gas into the plasma torch 14 through the plasma gas supply port 14d. For the plasma gas, gases such as argon gas and hydrogen gas are used alone or in combination as appropriate, for instance.

A sheath gas supply section (not shown) supplying sheath gas into the plasma torch 14 may be provided in addition to the plasma gas supply section 20. For the sheath gas, the same gas as the plasma gas can be used.

The sheath gas supply section may be provided in place of the plasma gas supply section 20.

The outside of the quartz tube 14a of the plasma torch 14 is surrounded by a concentrically formed quartz tube 14e, and cooling water 14f is circulated between the quartz tubes 14a and 14e to cool the quartz tube 14a with the water, thereby preventing the quartz tube 14a from having an excessively high temperature due to the thermal plasma flame 100 generated in the plasma torch 14.

The plasma generation section 21 is provided to generate the thermal plasma flame 100 in the plasma torch 14 as described above. The plasma generation section 21 includes a first coil 60 surrounding the periphery of the plasma torch 14, a second coil 62 surrounding the periphery of the plasma torch 14, a first power source section 21a supplying amplitude-modulated first high frequency current to the first coil 60, and a second power source section 21b supplying amplitude-modulated second high frequency current to the second coil 62. A degree of modulation of the first high frequency current is smaller than that of the second high frequency current, i.e., amplitude change of the first high frequency current is smaller than that of the second high frequency current. The first high frequency current and the second high frequency current are supplied at the same timing, for example. That is, the first high frequency current and the second high frequency current have the same phase.

The first coil 60 and the second coil 62 are arranged side by side in the longitudinal direction of the plasma torch 14, and the second coil 62 is disposed under the first coil 60.

The first power source section 21a and the second power source section 21b are both high frequency power sources and are independent of each other. It is preferable that the frequency of high frequency current of the first power source section 21a and the frequency of high frequency current of the second power source section 21b be different from each other in order to reduce magnetic coupling between the first coil 60 and the second coil 62. This configuration can suppress the influence of the power source sections on each other.

The first coil 60 and the second coil 62 constitute the high frequency oscillation coil 14b. The numbers of turns of the first coil 60 and the second coil 62 are not particularly limited and are suitably determined depending on the configuration of the production apparatus 10. Materials of the first coil 60 and the second coil 62 are also not particularly limited and are suitably determined depending on the configuration of the production apparatus 10.

With the use of the two coils and the two independent power source sections in the plasma generation section 21, a series structure of induction thermal plasma can be built. The provision of the series structure of induction thermal plasma makes it possible to generate a high-temperature field that is long in the axial direction of the plasma torch 14. When the long high-temperature field as above is used, it is possible to completely evaporate a high melting point material. A thermal plasma flame that is periodically switched between a high temperature state and a low temperature state having a lower temperature than that in the high temperature state at predetermined time intervals, i.e., that is time-modulated in terms of the temperature state, is called a modulated induction thermal plasma flame.

Figure 3:
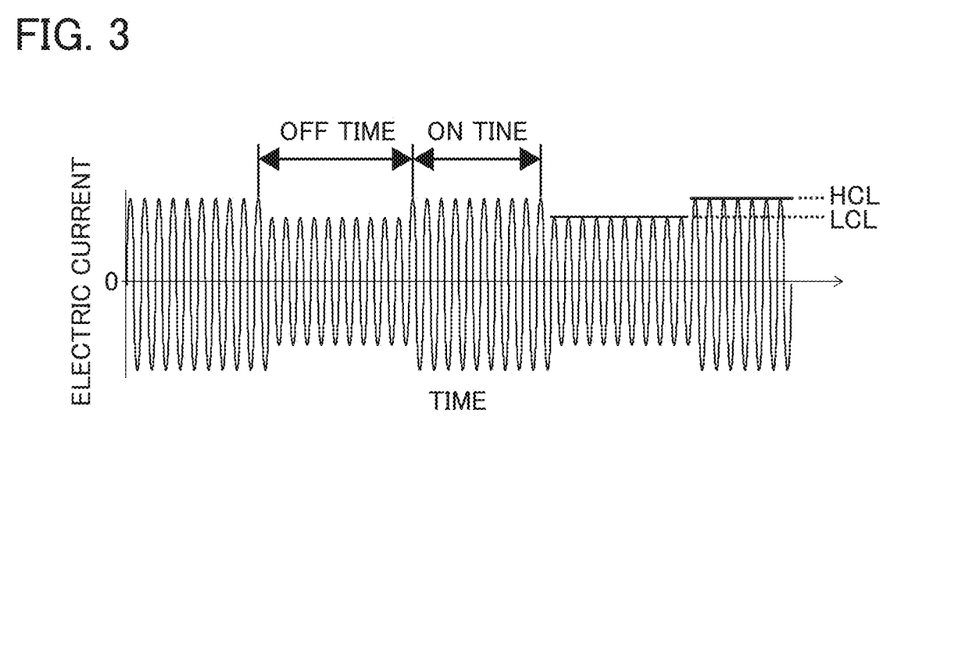
FIG. 3 is a schematic view showing an example of a waveform of high frequency current of a first power source section.
Figure 4:
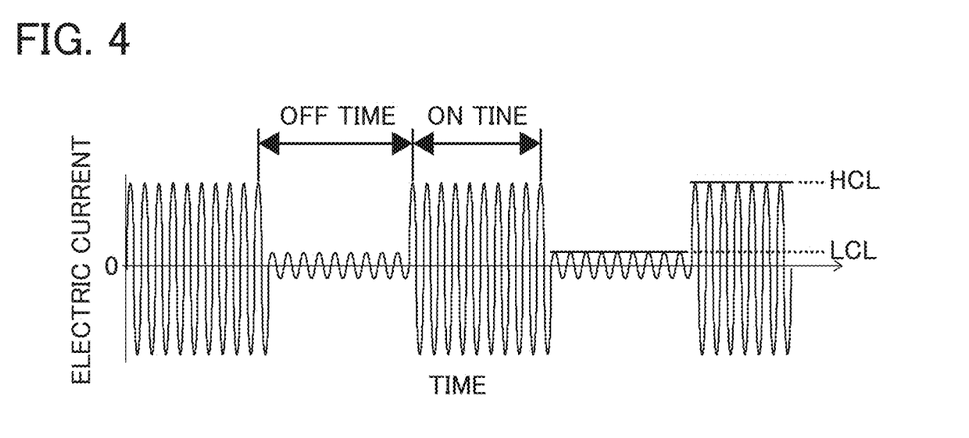
FIG. 4 is a schematic view showing an example of a waveform of high frequency current of a second power source section.

In the plasma generation section 21, for instance, the first power source section 21a supplies the first coil 60 with the amplitude-modulated first high frequency current (see FIG. 3), and the second power source section 21b supplies the second coil 62 with the amplitude-modulated second high frequency current (see FIG. 4).

The first high frequency current supplied to the first coil 60 is also called first coil current, and the second high frequency current supplied to the second coil 62 is also called second coil current.

FIG. 3 is a schematic view showing an example of a waveform of high frequency current of the first power source section, and FIG. 4 is a schematic view showing an example of a waveform of high frequency current of the second power source section.

FIG. 3 shows a waveform of the amplitude-modulated first high frequency current described above, where the amplitude is periodically modulated over time. FIG. 4 shows a waveform of the amplitude-modulated second high frequency current described above, where the amplitude is periodically modulated over time. FIG. 4 shows square wave amplitude modulation. The amplitude modulation is not limited to the square wave amplitude modulation shown in FIGS. 3 and 4, and needless to say, use may be made of a waveform formed of a repetitive wave including a curved line having a triangle wave, a sawtooth wave, a reverse sawtooth wave, a sine wave or the like.

In the amplitude-modulated first and second high frequency currents, the high value of the current amplitude is defined as a higher current level (HCL), the low value of the current amplitude is defined as a lower current level (LCL), and the time with HCL and the time with LCL in one modulation cycle are respectively defined as the ON time and the OFF time. Further, the percentage of the ON time in one cycle: (ON time/(ON time+OFF time)×100(%)) is defined as a duty factor (DF). The ratio (LCL/HCL×100(%)) in the amplitude is defined as a current modulation ratio (SCL). The current modulation ratio (SCL) represents the degree of modulation of current amplitude, where 100% SCL represents an unmodulated state and 0% SCL represents that the current amplitude is most largely modulated. At 0% SCL, the current value of high frequency current is 0 ampere (A) during the OFF time, i.e., in a region where the current amplitude of high frequency current is low, which will be described later.

The amplitude modulation of the first high frequency current and the amplitude modulation of the second high frequency modulation are not particularly limited as long as the degree of modulation of the first high frequency current is smaller than that of the second high frequency current as described above, and the amplitude modulation may be not less than 0% SCL and less than 100% SCL. In particular, it is most preferable that the amplitude modulation of the second high frequency current be 0% SCL because a value closer to 0% SCL refers to a higher degree of modulation, i.e., larger amplitude modulation. That is, the current value is preferably 0 amperes in a region where the current amplitude of the second high frequency current is low.

The ON time (see FIGS. 3 and 4) corresponds to a region where the current amplitude of high frequency current is high, and the OFF time (see FIGS. 3 and 4) corresponds to a region where the current amplitude of high frequency current is low. The OFF time is also called a modulation time. The ON time, the OFF time and one cycle described above are each preferably on the order of microseconds to several seconds.

In the plasma generation section 21, for example, the first power source section 21a supplies the first coil 60 with the amplitude-modulated first high frequency current (see FIG. 3) and the second power source section 21b supplies the second coil 62 with the amplitude-modulated second high frequency current (see FIG. 4), whereby the thermal plasma flame 100 is generated in the plasma torch 14. The temperature of the thermal plasma flame 100 can be varied with larger temperature difference by use of the amplitude-modulated first and second high frequency currents respectively supplied to the first coil 60 and the second coil 62, thereby controlling the temperature inside the plasma torch 14 with larger temperature difference. With this configuration, a varying temperature field in which the temperature state of the thermal plasma flame 100 is time-modulated and the temperature difference is large is obtained, so that the temperature state of the thermal plasma flame 100 is periodically switched between the high temperature state and the low temperature state having a lower temperature than that in the high temperature state. With the largely-varying temperature field provided by the thermal plasma flame 100, the particle size of fine particles can be controlled, and fine particles with a smaller particle size can be obtained.

The ambient pressure inside the plasma torch 14 is suitably determined depending on production conditions of fine particles and is, for example, not higher than the atmospheric pressure. The atmosphere with a pressure of not higher than the atmospheric pressure is not particularly limited, and for example, the pressure may range from 5 Torr (666.5 Pa) to 750 Torr (99.975 kPa).

As to the chamber 16, as shown in FIG. 1, from the side closer to the plasma torch 14, an upstream chamber 16a is attached to the plasma torch 14 to be concentric therewith. A downstream chamber 16b is provided perpendicularly to the upstream chamber 16a, and on a further downstream side, there is provided a collection section 18 including a desired filter 18a for collecting fine particles. In the production apparatus 10, a fine particle collection site is for example the filter 18a.

The chamber 16 is connected with the gas supply section 22. Quenching gas supplied from the gas supply section 22 is used to generate fine particles (not shown) of a material corresponding to the feedstock in the chamber 16. The chamber 16 also serves as a cooling tank.

The collection section 18 includes a collection chamber having the filter 18a, and a vacuum pump 18b connected through a pipe provided at a lower portion of the collection chamber. The fine particles transported from the chamber 16 are sucked by the vacuum pump 18b to be introduced into the collection chamber, and those fine particles remaining on the surface of the filter 18a are collected.

The gas supply section 22 is configured to supply quenching gas to the thermal plasma flame 100 in the chamber 16. The quenching gas serves as cooling gas. The gas supply section 22 includes a gas supply source (not shown) storing gas and a pressure application section (not shown) such as a compressor or a blower which applies push-out pressure to the quenching gas to be supplied into the chamber 16. Further, a regulating valve (not shown) controlling the amount of gas supplied from the gas supply source is provided. The gas supply source for use is determined depending on the composition of the quenching gas. The type of the gas is not limited to a single type, and when the quenching gas is a mixed gas, a plurality of gas supply sources are prepared.

The type of the quenching gas is not particularly limited as long as it exercises a cooling function. Inert gases unreactive with the feedstock, such as argon gas, nitrogen gas and helium gas, are usable as the quenching gas, for example. The quenching gas may additionally contain hydrogen gas. The quenching gas may contain reactive gas that reacts with the feedstock. Examples of the reactive gas include hydrocarbon gases such as methane, ethane, propane, butane, acetylene, ethylene, propylene and butene.

The gas supply section 22 supplies the quenching gas (cooling gas) at an angle of, for example, 45 degrees toward a tail portion 100b of the thermal plasma flame 100 (see FIG. 2), i.e., the end of the thermal plasma flame 100 on the opposite side from the plasma gas supply port 14d, that is, a terminating portion of the thermal plasma flame 100, and also supplies the quenching gas (cooling gas) downward along an inner wall of the chamber 16. However, the configuration is not limited to supplying the quenching gas to the terminating portion of the thermal plasma flame 100.

The quenching gas supplied from the gas supply section 22 into the chamber 16 quenches the mixture having been transformed to a gas phase state with the thermal plasma flame 100, thereby obtaining fine particles of a material corresponding to the feedstock. Besides, the quenching gas above has additional functions such as contribution to classification of fine particles.

Immediately after fine particles of a material corresponding to the feedstock is generated, if the fine particles collide with each other to form agglomerates, this causes nonuniform particle size, resulting in lower quality. However, since the quenching gas is supplied toward the tail portion 100b (terminating portion) of the thermal plasma flame, the fine particles are diluted with the quenching gas and thereby prevented from colliding with each other to agglomerate together.

In addition, since the quenching gas is supplied along the inner wall surface of the chamber 16, the fine particles are prevented from adhering to the inner wall of the chamber 16 in the process of collection of the fine particles, whereby the yield of the generated fine particles is improved.

The method of supplying the quenching gas to the thermal plasma flame 100 by the gas supply section 22 is not particularly limited, and the quenching gas may be supplied from a single direction. Alternatively, the quenching gas may be supplied from plural directions surrounding the periphery of the thermal plasma flame 100. In this case, plural supply ports for the quenching gas are provided at the outer peripheral surface of the chamber 16 along the circumferential direction, for example, at regular intervals, although the arrangement at regular intervals is not essential.

When the quenching gas is supplied from plural directions, the supply timing is not particularly limited, and the quenching gas is supplied from plural directions in a synchronized manner. Alternatively, the quenching gas may be supplied in a clockwise or counterclockwise order, for instance. In this case, the quenching gas generates a gas flow such as a swirl flow in the chamber 16. When supplied from plural directions, the quenching gas may be supplied in a random order without determining the order of supply.

The gas supply section 22 is not necessarily required if fine particles can be generated without the use of the quenching gas. In the case of the configuration without the gas supply section 22, this leads to simplification of the apparatus configuration of the production apparatus 10 as well as steps of the fine particle production method.

As described above, the feedstock supply section 12 supplies the feedstock to the thermal plasma flame 100, for instance, supplies the feedstock in a predetermined amount, i.e., in a fixed amount regardless of time.

The feedstock supply section 12 is not limited to the one supplying a fixed amount of the feedstock and may be one supplying the feedstock into the thermal plasma flame 100 while time-modulating the amount of supply of the feedstock into the thermal plasma flame 100. With this configuration, a large amount of the feedstock can be supplied during the ON time shown in FIGS. 3 and 4. Consequently, a large amount of smaller fine particles can be manufactured. In this case, the supply tube 13 is provided with the intermittent supply section 15, for example. The feedstock is supplied into the chamber 16 while the supply is time-modulated by means of the intermittent supply section 15. The change of the amount of supply of the feedstock is not particularly limited and may assume any of sinusoidal, triangular, rectangular and sawtooth waveforms, while the change preferably conforms to the amplitude modulation of the first high frequency current supplied to the first coil 60 and the amplitude modulation of the second high frequency current supplied to the second coil 62. That is, it is preferable that the change of the amount of supply of the feedstock synchronize with the time-based change of the amplitude modulation of the first high frequency current and the amplitude modulation of the second high frequency current which are expressed as functions. This configuration makes it easy to adjust the ON time and the timing of supply of the feedstock to each other.

For the intermittent supply section 15, for instance, a solenoid valve (electromagnetic valve) connected to the supply tube 13 is used to time-modulate the amount of supply of the feedstock. The control section 24 controls the opening and closing of the solenoid valve. A ball valve may be used instead of the solenoid valve. Also in this case, the control section 24 controls the opening and closing of the ball valve. The control section 24 time-modulates the amount of supply of the feedstock in such a manner that, for instance, the amount of supply of the feedstock is increased during the ON time and the amount of supply of the feedstock is decreased during the OFF time. Consequently, a large amount of smaller fine particles can be manufactured. Therefore, in the supply of the feedstock, it is preferable that the amount of supply of the feedstock be increased during the ON time and the amount of supply of the feedstock be decreased during the OFF time. Thus, the feedstock is supplied during the ON time, whereby a large amount of the feedstock can be evaporated, and this allows generation of a large amount of fine particles, so that a large amount of fine particles can be efficiently produced with high productivity.

Next, a fine particle production method using the production apparatus 10 above is described taking metal fine particles as an example.

First, for example, Si powder having a volume mean diameter of not more than 30 μm is put into the feedstock supply section 12 as the feedstock powder for metal fine particles.

For instance, argon gas is used as the plasma gas. The first power source section 21a supplies the first coil 60 with amplitude-modulated first high frequency current. The second power source section 21b supplies the second coil 62 with amplitude-modulated second high frequency current. As a consequence, the thermal plasma flame 100 is generated in the plasma torch 14. The amplitude modulation of the first high frequency current supplied to the first coil 60 is for example at 90% SCL, the amplitude modulation of the second high frequency current supplied to the second coil 62 is for example at 0% SCL, the modulation cycle is 15 ms, the ON time is 10 ms, and the OFF time is 5 ms.

Next, the Si powder is transported with gas, e.g., argon gas used as the carrier gas and supplied into the thermal plasma flame 100 in the plasma torch 14 through the supply tube 13 (first step). The supplied Si powder is evaporated in the thermal plasma flame 100 and becomes the mixture 45 (see FIG. 2) in a gas phase state. The mixture 45 (see FIG. 2) in a gas phase state is cooled (second step). As a result, Si fine particles (metal fine particles) are obtained.

Then, the Si fine particles obtained in the chamber 16 are collected on the filter 18a of the collection section 18 owing to negative pressure (suction force) applied from the collection section 18 by the vacuum pump 18b.

As described above, the thermal plasma flame 100 can be periodically switched in a stable state between the high temperature state and the low temperature state having a lower temperature than that in the high temperature state; therefore, it is possible to control the particle size of fine particles and obtain fine particles having excellent uniformity in particle size.

The cooling of the mixture 45 (see FIG. 2) in a gas phase state (second step) is not particularly limited and may be natural cooling that allows the mixture to cool without using a cooling medium such as quenching gas. In the case of using no quenching gas, the temperature of the thermal plasma flame 100 during the OFF time can be reduced with the temperature of the thermal plasma flame 100 during the ON time being maintained by decreasing the value of SCL, i.e., increasing the degree of modulation of the second high frequency current; therefore, Si fine particles (metal fine particles) with smaller size can be obtained even without cooling using the quenching gas. In this case, steps of the fine particle production method can be simplified.

Alternatively, for instance, argon gas may be supplied as the quenching gas from the gas supply section 22 to the tail portion 100b of the thermal plasma flame 100 (see FIG. 2), i.e., the terminating portion of the thermal plasma flame 100 to quench the mixture 45 (see FIG. 2). Consequently, the thermal plasma flame 100 is quenched whereby Si fine particles (metal fine particles) are generated. At this time, a low temperature region is formed in the chamber 16, so that still smaller Si fine particles (metal fine particles) can be obtained.

When the Si powder is supplied into the thermal plasma flame 100 in the plasma torch 14, it is preferable to increase the amount of supply of the Si powder during the ON time and decrease the amount of supply of the Si powder during the OFF time, as described above. Alternatively, the supply of the Si powder may be controlled such that the Si powder is supplied during the ON time and not supplied during the OFF time. In any case, it takes time after the solenoid valve is opened until the feedstock is actually transported and the amount of supply of the feedstock into the thermal plasma flame 100 increases, and therefore, the solenoid valve and the like need to be controlled taking the time required for the transportation into account.

Figure 5A:
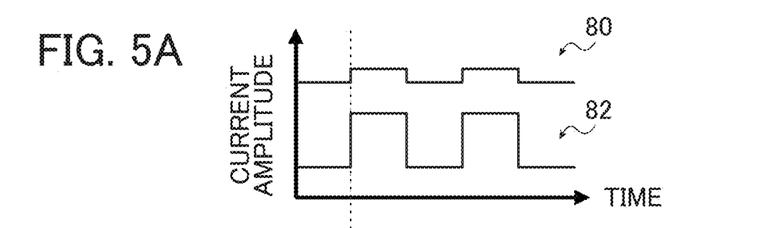
FIG. 5A is a graph showing an example of waveforms of first high frequency current and second high frequency current.
Figure 5B:
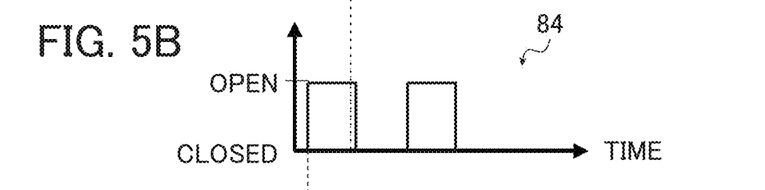
FIG. 5B is a graph showing opening and closing timing of a valve.
Figure 5C:
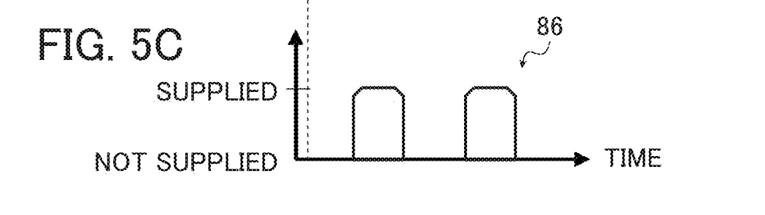
FIG. 5C is a graph showing the supply of feedstock.

FIG. 5A is a graph showing an example of waveforms of first high frequency current and second high frequency current, FIG. 5B is a graph showing opening and closing timing of a valve, and FIG. 5C is a graph showing the supply of feedstock.

In the embodiment, for example, the opening and closing timing of a valve is determined taking the transportation time into account on the basis of a waveform signal 80 (see FIG. 5A) of the first coil 60 which is subjected to square wave amplitude modulation and a waveform signal 82 (see FIG. 5A) of the second coil 62 which is subjected to square wave amplitude modulation, a timing signal 84 for opening and closing the valve is obtained as shown in FIG. 5B, and the valve is opened and closed at predetermined time intervals. Consequently, for instance, the feedstock powder is supplied into the plasma torch 14 during the ON time in a waveform 86 shown in FIG. 5C, and as a result, the feedstock can be intermittently supplied.

It is preferable that amplitude modulation is performed while an average input power to the first coil 60 and that to the second coil 62 are each kept constant. In addition, the pressure inside the plasma torch is set to a constant value during production of fine particles, for example.

From the foregoing, a varying temperature field with large temperature difference of the thermal plasma flame 100 can be formed by use of the amplitude-modulated first and second high frequency currents, and supply of feedstock during the ON time allows complete evaporation of the feedstock. Further, since feedstock supplied around the ON time is quenched well compared to that supplied during the unmodulated state, it can be expected that the growth of particles in a growing stage can be further suppressed. Thus, when the first high frequency current and the second high frequency current are amplitude-modulated, an efficient nanoparticle generation process can be carried out. Further, since the temperature of the varying temperature field of the thermal plasma flame can be further reduced during the OFF time by making the value of SCL of the second high frequency current smaller than the value of SCL of the first high frequency current, more reliable evaporation and efficient cooling of particles in a growing stage are possible. This configuration makes it possible to obtain fine particles with a smaller size.

The production apparatus 10 of this embodiment is capable of producing, for instance, nanosized Si fine particles using Si powder as the feedstock. However, the invention is not limited thereto, and particles of another element may be used as the feedstock for fine particle production to produce fine particles of an oxide, a metal, a nitride or a carbide of that element. In this case, the fine particle production may involve slurrying.

When the feedstock is powder, the average particle size thereof is appropriately set to allow easy evaporation of the feedstock in the thermal plasma flame and is, for example, up to 100 μm, preferably up to 10 μm and more preferably up to 5 μm when converted to the BET diameter.

For instance, any type of feedstock may be used as long as it can be evaporated by the thermal plasma flame, and the following substances are preferred. That is, there may be appropriately selected one of a single element oxide, a complex oxide, a multiple oxide, an oxide solid solution, a metal, an alloy, a hydroxide, a carbonic acid compound, a halide, a sulfide, a nitride, a carbide, a hydride, a metal salt and a metal-organic compound each of which contains at least one selected from the group consisting of the elements with the atomic numbers 3 to 6, 11 to 15, 19 to 34, 37 to 52, 55 to 60, 62 to 79 and 81 to 83.

The single element oxide refers to an oxide formed from one element in addition to oxygen, the complex oxide refers to an oxide constituted of plural types of oxides, the multiple oxide refers to a higher order oxide formed from two or more types of oxides, and the oxide solid solution refers to a solid in which different oxides are dissolved and uniformly mixed with each other. The metal refers to one consisting of one or more metallic elements alone, and the alloy refers to one constituted of two or more metallic elements. The alloy structure assumes the state of a solid solution, a eutectic mixture, an intermetallic compound, or a mixture thereof in some cases.

The hydroxide refers to one constituted of a hydroxyl group and one or more metallic elements, the carbonic acid compound refers to one constituted of a carbonic acid group and one or more metallic elements, the halide refers to one constituted of a halogen and one or more metallic elements, and the sulfide refers to one constituted of sulfur and one or more metallic elements. The nitride refers to one constituted of nitrogen and one or more metallic elements, the carbide refers to one constituted of carbon and one or more metallic elements, and the hydride refers to one constituted of hydrogen and one or more metallic elements. The metal salt refers to an ionic compound containing at least one or more metallic elements, and the metal-organic compound refers to an organic compound having a bond between one or more metallic elements and at least one of elements C, O and N, as exemplified by a metal alkoxide and an organometallic complex.

Examples of the single element oxide include a titanium oxide ($TiO_2$), a zirconium oxide ($ZrO_2$), a calcium oxide (CaO), a silicon oxide ($SiO_2$), an aluminum oxide (alumina: $Al_2O_3$), a silver oxide ($Ag_2$), an iron oxide, a magnesium oxide (MgO), a manganese oxide ($Mn_3O_4$), an yttrium oxide ($Y_2O_3$), a cerium oxide, a samarium oxide, a beryllium oxide (BeO), a vanadium oxide ($V_2O_5$), a chromium oxide ($Cr_2O_3$), and a barium oxide (BaO).

Examples of the complex oxide include a lithium aluminate ($LiAlO_2$), an yttrium vanadate, a calcium phosphate, a calcium zirconate ($CaZrO_3$), a titanium lead zirconate, a titanium iron oxide ($FeTiO_3$) and a titanium cobalt oxide ($CoTiO_3$). Examples of the multiple oxide include a barium stannate ($BaSnO_3$), a barium (meta)titanate ($BaTiO_3$), a lead titanate ($PbTiO_3$), and a solid solution in which a zirconium oxide and a calcium oxide dissolve as solids in a barium titanate.

The hydroxide can be exemplified by $Zr(OH)_4$, the carbonic acid compound by $CaCO_3$, the halide by $MgF_2$, the sulfide by ZnS, the nitride by TiN, the carbide by SiC, and the hydride by $TiH_2$.

Fine particle production using the production apparatus 10 shown in FIG. 1 described above is described more specifically.

The time-averaged input power to the first coil and that to the second coil were each set to 10 kW. The frequency of high frequency current of the first coil was set to 460 kHz, and the frequency of high frequency current of the second coil was set to 320 kHz.

The first high frequency current and the second high frequency current were each set to one subjected to square wave amplitude modulation. SCL representing the degree of modulation was set to 90% for the first high frequency current and 0% for the second high frequency current. The modulation cycle was set to 15 ms, the ON time to 10 ms, and the OFF time to 5 ms. The duty factor (DF) was 66%.

The pressure inside the plasma torch was set to 300 Torr (about 40 kPa). Ar gas was introduced as the sheath gas at a flow rate of 90 liter/min. Furthermore, Si feedstock powder was supplied to a thermal plasma flame by using Ar gas (carrier gas) at a flow rate of 4 liter/min. No quenching gas was used.

As the Si feedstock powder, Si powder (purity: 97%) having a volume mean diameter of 26 μm was used. A solenoid valve was operated in synchronization with the modulation of the first high frequency current (modulated current) and the second high frequency current (modulated current) synchronized with the ON time, and the Si feedstock powder was intermittently supplied in an amount of supply of 3.0 g/min. This is hereinafter called Example 1.

For comparison, fine particles were produced with the same conditions as those of Example 1 described above except that high frequency current of the first coil was not amplitude-modulated at 100% SCL, high frequency current of the second coil was amplitude-modulated at 0% SCL, and the amount of supply of the Si feedstock powder was set to 1.5 g/min. This is hereinafter called Example 2.

Further, for comparison, fine particles were produced with the same conditions as those of Example 1 described above except that neither high frequency current of the first coil nor that of the second coil was amplitude-modulated, i.e., the SCL was set to 100% and the amount of supply of the Si feedstock powder was set to 2.8 g/min. This is hereinafter called Example 3.

Figure 6:
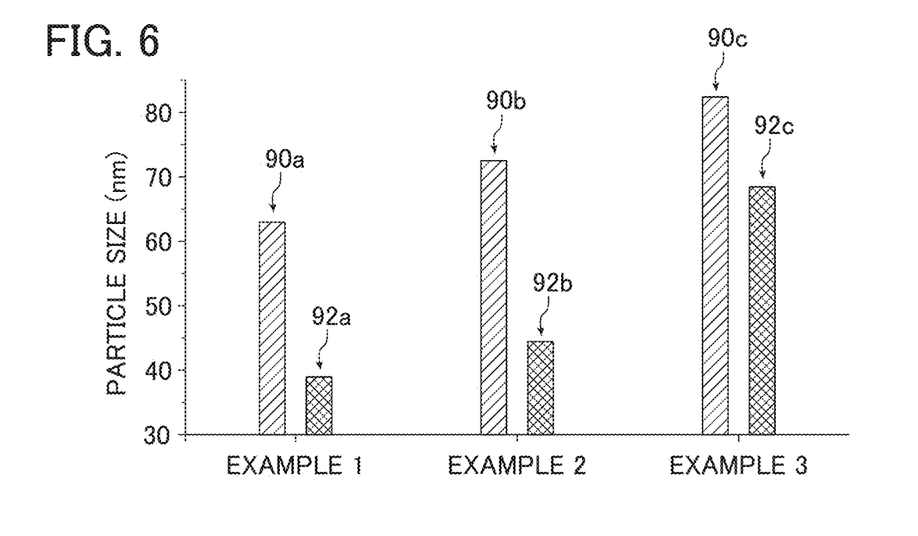
FIG. 6 is a graph showing average particle sizes and standard deviations of particle size distributions of Examples 1 to 3.

A particle size distribution of the fine particles of each of Examples 1 to 3 described above was obtained. For the particle size distribution, an SEM image of a plurality of fine particles thus produced was obtained, and 300 fine particles were randomly selected from the SEM image of the plurality of fine particles. The particle size of each of the selected fine particles was measured from the SEM image, and the particle size distribution was obtained on the basis of the particle size of each of the fine particles. The average particle size and the standard deviation of the fine particles were determined from the obtained particle size distribution of the fine particles. The result is shown in FIG. 6. The average particle size of the fine particles is an average value of the diameters of the 300 fine particles that were randomly selected. The standard deviation is a value obtained from the diameters of the 300 fine particles that were randomly selected.

In FIG. 6, reference sign 90a represents an average particle size d of Example 1, reference sign 90b represents an average particle size d of Example 2, and reference sign 90c represents an average particle size d of Example 3. Reference sign 92a represents a standard deviation σ of the particle size distribution of Example 1, reference sign 92b represents a standard deviation σ of the particle size distribution of Example 2, and reference sign 92c represents a standard deviation σ of the particle size distribution of Example 3. The average particle size d and the standard deviation σ of Example 1 were 63.0 nm and 38.5 nm, respectively, the average particle size d and the standard deviation σ of Example 2 were 72.5 nm and 44.5 nm, respectively, and the average particle size d and the standard deviation σ of Example 3 were 82.7 nm and 68.3 nm, respectively.

As shown in FIG. 6, the average particle size and the standard deviation of Example 1 in which the first high frequency current and the second high frequency current were amplitude-modulated are small. The average particle size and the standard deviation of Example 2 in which the first high frequency current was not amplitude-modulated and only the second high frequency current was amplitude-modulated are larger than those of Example 1 but smaller than those of Example 3. The average particle size and the standard deviation of Example 3 in which neither the first high frequency current nor the second high frequency current was amplitude-modulated are larger than those of Example 2.

It should be noted that Examples 1 and 3 have substantially the same amount of supply of the Si feedstock powder, and the amount of supply of the Si feedstock powder of Example 2 is a half of that of Example 1 and small. In general, when an amount of supply of feedstock powder is small, a particle size tends to be small. However, the average particle size and also the standard deviation of Example 2 are larger than those of Example 1. In Example 1, even though the amount of supply of the Si feedstock powder is larger than that of Example 2, fine particles can be produced, and the productivity is high.

Figure 7:
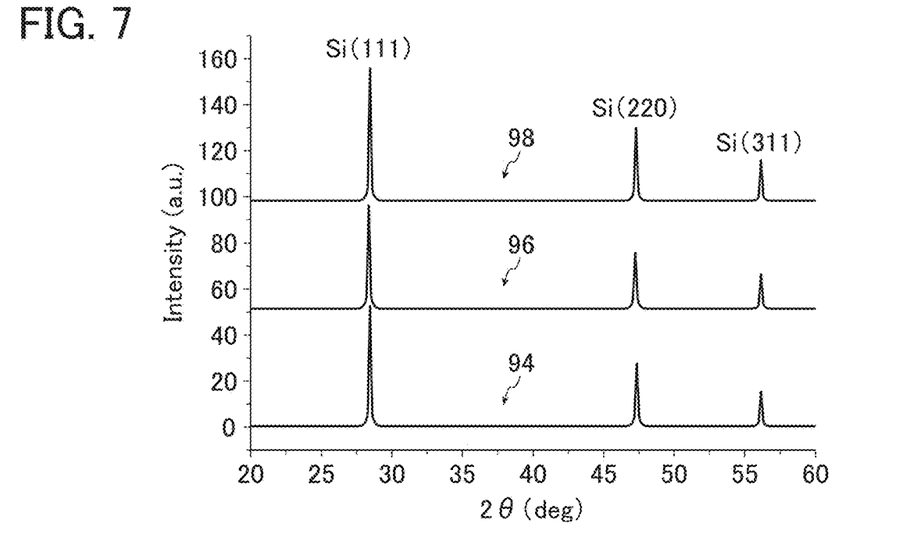
FIG. 7 is a graph showing analysis results of crystal structures of Examples 1 to 3 as obtained by X-ray diffractometry.

The crystal structure of the fine particles of each of Examples 1 to 3 was analyzed by using XRD (X-ray diffractometry). The result is shown in FIG. 7. In FIG. 7, reference sign 94 represents an XRD spectrum of Example 1, reference sign 96 represents an XRD spectrum of Example 2, and reference sign 98 represents an XRD spectrum of Example 3.

The analysis results of the crystal structures as obtained by X-ray diffractometry (XRD) as shown in FIG. 7 revealed that Examples 1 to 3 were all composed of Si.

Figure 8:
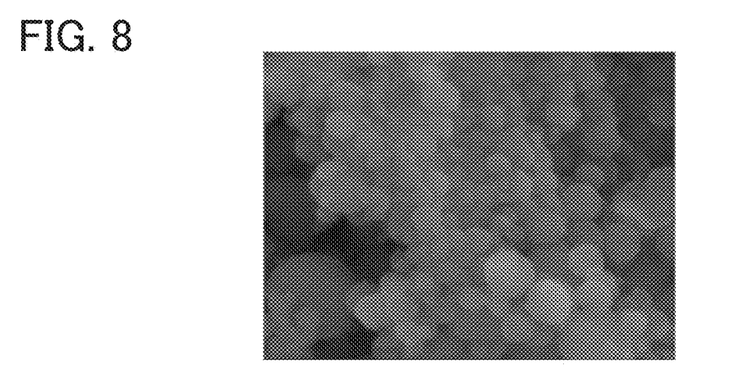
FIG. 8 is a schematic view showing an SEM image of fine particles of Example 1.
Figure 9:
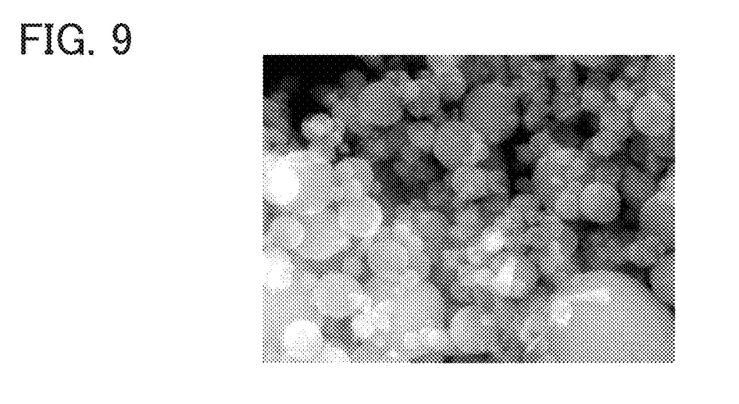
FIG. 9 is a schematic view showing an SEM image of fine particles of Example 2.
Figure 10:
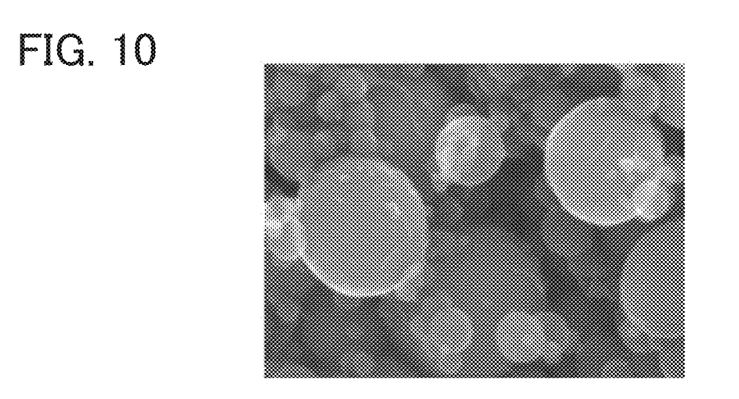
FIG. 10 is a schematic view showing an SEM image of fine particles of Example 3.

FIG. 8 shows an SEM image of the fine particles of Example 1, FIG. 9 shows an SEM image of the fine particles of Example 2, and FIG. 10 shows an SEM image of the fine particles of Example 3. The magnification of each of FIGS. 8 and 9 is 100000 times, and the magnification of FIG. 10 is 95000 times.

As shown in FIGS. 8 and 10, the particle size of the fine particles of Example 1 was smaller than that of the fine particles of Example 3, and further, the number of coarse particles of Example 1 was smaller than that of coarse particles of Example 3, and the fine particles of Example 1 were more uniform than those of Example 3.

As shown in FIGS. 8 and 9, the particle size of the fine particles of Example 1 was smaller than that of the fine particles of Example 2, and further, the number of coarse particles of Example 1 was smaller than that of coarse particles of Example 3, and the fine particles of Example 1 were more uniform than those of Example 3.

In comparison between the fine particles of Example 2 and the fine particles of Example 3, only the second high frequency current was amplitude-modulated for the fine particles of Example 2, and the particle size of the fine particles of Example 2 was smaller than that of the fine particles of Example 3, and further, the number of the coarse particles of Example 2 was smaller than that of the coarse particles of Example 3.

The present invention is basically configured as above. While the fine particle production apparatus and the fine particle production method according to the invention are described above in detail, the invention is by no means limited to the foregoing embodiments and it should be understood that various improvements and modifications are possible without departing from the scope and spirit of the invention.

REFERENCE SIGNS LIST 10 fine particle production apparatus (production apparatus)
12 feedstock supply section
13 supply tube
14 plasma torch
14a quartz tube
14b high frequency oscillation coil
14c supply port
14d plasma gas supply port
14e quartz tube
14f cooling water
15 intermittent supply section
16 chamber
16a upstream chamber
16b downstream chamber
18 collection section
18a filter
18b vacuum pump
20 plasma gas supply section
21 plasma generation section
21a first power source section
21b second power source section
22 gas supply section
24 control section
45 mixture
60 first coil
62 second coil
80, 82 waveform signal
84 timing signal
86 waveform 90a average particle size of Example 1
90b average particle size of Example 2
90c average particle size of Example 3
92a standard deviation of particle size distribution of Example 1
92b standard deviation of particle size distribution of Example 2
92c standard deviation of particle size distribution of Example 3
94 XRD spectrum of Example 1
96 XRD spectrum of Example 2
98 XRD spectrum of Example 3
100 thermal plasma flame
100b tail portion

The invention claimed is:

1. A fine particle production method using a thermal plasma flame generated inside a plasma torch,
there being provided a first coil surrounding a periphery of the plasma torch, a second coil disposed under the first coil and surrounding the periphery of the plasma torch, a first power source section supplying the first coil with first high frequency current amplitude-modulated, and a second power source section supplying the second coil with second high frequency current amplitude-modulated, the first coil and the second coil being arranged side by side in a longitudinal direction of the plasma torch, and the thermal plasma flame being generated by the first power source section and the second power source section, the method comprising:
a first step of supplying feedstock for fine particle production to the thermal plasma flame generated inside the plasma torch; and
a second step of evaporating the feedstock by use of the thermal plasma flame to transform the feedstock into a mixture in a gas phase state and cooling the mixture, wherein in the first step and the second step, the first power source section supplies the first coil with the first high frequency current amplitude-modulated, the second power source section supplies the second coil with the second high frequency current amplitude-modulated, and a degree of modulation of the first high frequency current is smaller than that of the second high frequency current,
wherein the first high frequency current supplied to the first coil by the first power source section has a region where current amplitude of the first high frequency current is high and a region where a current amplitude of the first high frequency current is lower than that in the region where the current amplitude of the first high frequency current is high, and the second high frequency current supplied to the second coil by the second power source section has a region where a current amplitude of the second high frequency current is high and a region where the current amplitude of the second high frequency current is lower than that in the region where the current amplitude of the second high frequency current is high, and
wherein in the first step, the first high frequency current supplied to the first coil by the first power source section and the second high frequency current supplied to the second coil by the second power source section are supplied at a same timing, and an amount of supply of the feedstock is increased in each region where the current amplitude of the first high frequency current and the region where the current amplitude of the second high frequency current are high.

2. The fine particle production method according to claim 1, wherein in the second step, quenching gas is supplied to the thermal plasma flame to cool the mixture in a gas phase state.

3. The fine particle production method according to claim 2, wherein in the first step, the feedstock is supplied into the thermal plasma flame with the feedstock being dispersed in a particulate form.

4. The fine particle production method according to claim 2, wherein in the first step, the feedstock is dispersed in liquid to obtain a slurry, the slurry is transformed into droplets, and the droplets are supplied into the thermal plasma flame.

5. The fine particle production method according to claim 1, wherein a current value of the second high frequency current amplitude-modulated and supplied to the second coil is 0 ampere in the region where the current amplitude of the second high frequency current is lower than that in the region where the current amplitude of the second high frequency current is high.

6. The fine particle production method according to claim 1, wherein in the first step, the feedstock is supplied into the thermal plasma flame with the feedstock being dispersed in a particulate form.

7. The fine particle production method according to claim 1, wherein in the first step, the feedstock is dispersed in liquid to obtain a slurry, the slurry is transformed into droplets, and the droplets are supplied into the thermal plasma flame.

* * * * *